United States Patent [19]

Lamnabhi

[11] Patent Number: 5,055,925
[45] Date of Patent: Oct. 8, 1991

[54] ARRANGEMENT FOR ESTIMATING MOTION IN TELEVISION PICTURES

[75] Inventor: Moustanir Lamnabhi, Gif sur Yvette, France

[73] Assignee: U.S. Philips Corporation, New York, N.Y.

[21] Appl. No.: 491,149

[22] Filed: Mar. 9, 1990

[30] Foreign Application Priority Data

Mar. 24, 1989 [FR] France .................................. 89 03932

[51] Int. Cl.$^5$ .................... H04N 7/18; H04N 7/12; H04N 7/01; H04N 11/20
[52] U.S. Cl. .................................. 358/105; 358/135; 358/140; 358/11
[58] Field of Search ............... 358/105, 135, 136, 140, 358/11, 12

[56] References Cited

U.S. PATENT DOCUMENTS

| | | | |
|---|---|---|---|
| 4,383,272 | 5/1983 | Netravali et al. | 358/136 |
| 4,703,350 | 10/1987 | Hinman | 358/105 |
| 4,727,422 | 2/1988 | Hinman | 358/105 |
| 4,864,398 | 9/1989 | Avis et al. | 358/105 |
| 4,947,248 | 8/1990 | Hienerwadel et al. | 358/105 |
| 4,965,667 | 10/1990 | Trew et al. | 358/105 |

Primary Examiner—John K. Peng
Attorney, Agent, or Firm—Michael E. Marion

[57] ABSTRACT

The arrangement has an input (10) to receive a sequence of source pictures, a motion determining circuit (20) to supply a first motion vectors for all the elements of the pictures of the sequence to be processed, a coherence circuit (21) to supply a validation signal (KF) of the first motion vector, and a selection circuit (25), which is controlled by the coherence circuit, to supply a definitive motion vector on the basis of said first motion vector and at least one alternative motion vector. The coherence circuit comprises a first portion (30), to supply a first coherence signal (KS) related to a picture element, from, at least, motion vectors assigned to elements surrounding said picture element, and a second portion (32) to supply a second coherence signal from first coherence signals assigned to elements, corresponding to said element of a plurality of pictures of the sequence to be processed.

18 Claims, 4 Drawing Sheets

ARRANGEMENT FOR ESTIMATING MOTION IN TELEVISION PICTURES

BACKGROUND OF THE INVENTION

The present invention relates to an arrangement for estimating motion of picture elements of a picture forming part of a sequence of pictures to be processed, the arrangement having an input for receiving a sequence of source pictures, a motion determining circuit for supplying a first motion vector for all the picture elements of the pictures of the sequence to be processed, a coherence circuit for supplying a validation signal of the first motion vector and a selection circuit, controlled by the coherence circuit, for supplying a definitive motion vector on the basis of said first motion vector and at least one alternative motion vector.

Such an arrangement is described in the non-prepublished international Patent Application WO-A 89/10600 (PHF 88-532) U.S. patent application Ser. No. 460,326, filed Dec. 18, 1989. The prior art arrangement is used in a standards converter, which, more specifically, converts pictures appearing at a rate of 50 Hz into pictures having a rate of 59.94 Hz. It is also possible to convert the pictures of the rate of 50 Hz into pictures having a rate of 100 Hz, by means of such converters, to avoid the annoying flicker phenomenon on television sets.

The described arrangement comprises three memories for containing coherence vectors relating to three successive pictures to supply the validation signal. Although this arrangement is satisfactory, Applicants have realized that it can be improved by processing coherence vectors relating to a larger number of pictures.

SUMMARY OF THE INVENTION

An arrangement according to the invention is characterized in that the coherence circuit comprises a first portion, for supplying a first coherence signal relating to a picture element, at least on the basis of motion vectors assigned to picture elements surrounding said picture element, and a second portion for supplying a second coherence signal on the basis of the first coherence signals assigned to picture elements, corresponding to said element, of a number of pictures of the sequence to be processed.

Applicants have also realized that it is important to vary the number of pictures for which the coherence vectors are established.

In addition, the arrangement of said type may be characterized in that the second portion comprises adder means of the recursive type for supplying a signal representing the sum of preceding values of first coherence signals for a given picture element, and threshold means for activating the second coherence signal if the sum signal exceeds a certain threshold.

Thus, by influencing the value of that threshold, the number of pictures for which the coherence is established varies.

BRIEF DESCRIPTION OF THE DRAWINGS

The following description which is given by way of non-limitative example with reference to the accompanying drawings will make it better understood how the invention can be put into effect.

DETAILED DESCRIPTION OF A PREFERRED EMBODIMENT OF THE INVENTION

Figure 1:
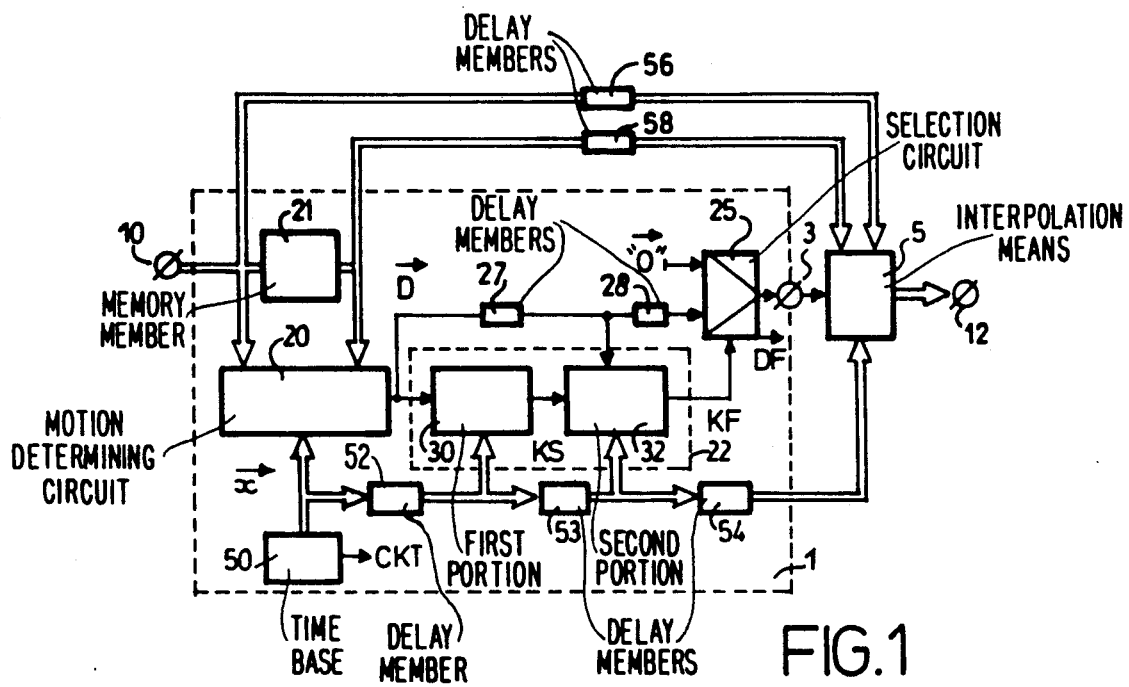
FIG. 1 shows the circuit diagram of an arrangement according to the invention cooperating with interpolation means.
Figure 2:
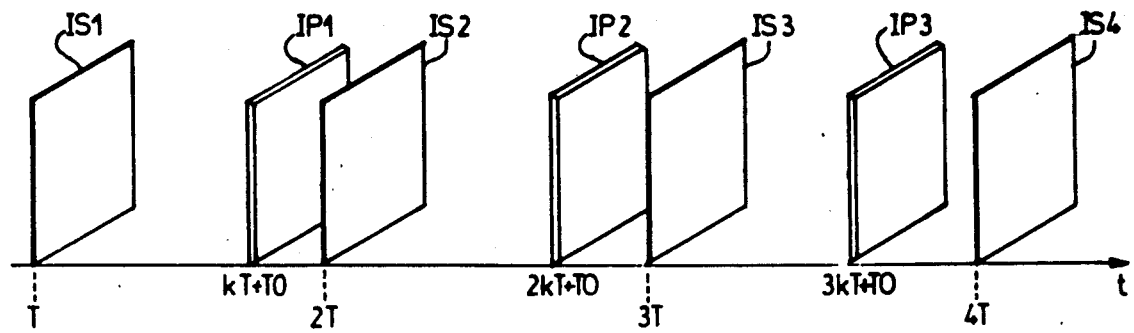
FIG. 2 shows the respective locations of the pictures of the source sequence and the sequence to be processed.
Figure 3:
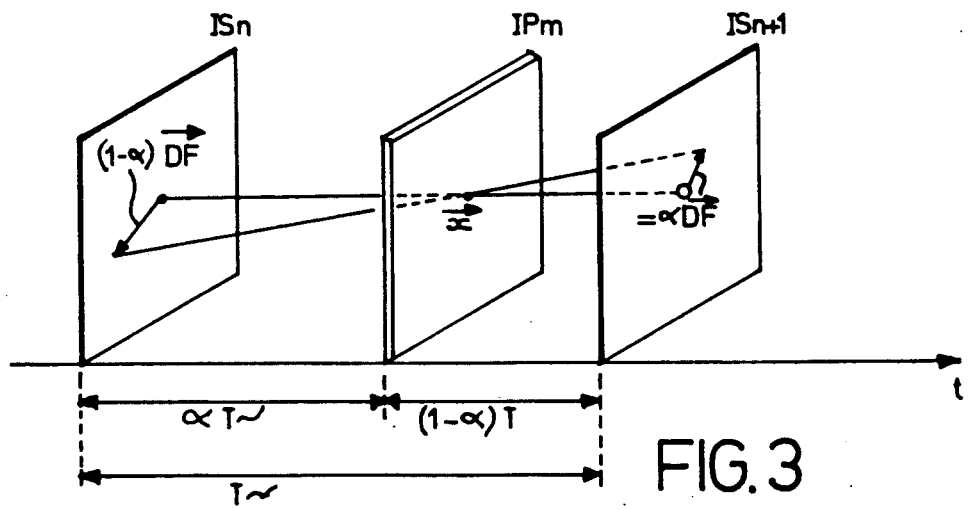
FIG. 3 shows how the interpolation is carried out by the interpolation means.

In FIG. 1, the arrangement for motion estimation in accordance with the invention is given the reference numeral 1 and applies motion vectors $\vec{DF}$ to interpolation means 5 via its output 3. These interpolation means effect a processing of the source picture sequences ..., IS1, IS2, IS3, IS4, ... (see FIG. 2) which appear at the input 10 at the instants ..., T, 2T, 3T, 4T, .... This processing has for its object to establish picture sequences ..., IP1, IP2, IP3, ... which become available at the output 12 of the means 5. These pictures are established for the instants ..., kT+TO, 2kT+TO, 3kT+TO, ... wherein k is a factor defining the rate at which the established pictures appear and TO is a zero point on the time axis. The picture elements of these pictures IP1 are determined by the interpolation means 5 by applying the following formula:

$$I_m(\vec{x}) = \alpha I_{n+1}[\vec{x} + (1-\alpha)\vec{DF}] + (1-\alpha)I_n(\vec{x} - \alpha\vec{DF})$$

wherein $I_m(x)$ is the luminance of the point having coordinates $\vec{x}$ of the picture $IP_m$ to be processed by interpolation on the basis of the pictures $IS_n$ and $IS_{n+1}$ located on both sides, as is shown in FIG. 3, $\alpha$ is a function of time and is such that $0 \leq \alpha \leq 1$, $I_{n+1}(-)$ is the luminance of the picture element for which the coordinates are given by the argument between brackets and which forms part of the picture $IS_{n+1}$, $I_n(-)$ is the luminance of the picture element whose coordinates are given by the argument and which forms part of the picture $IS_n$.

The estimation arrangement 1 comprises first of all a motion determining circuit 20 which, from the pictures $IS_n$ and $IS_{n+1}$ determines a first motion vector $\vec{D}$. A memory member 21 renders it possible for the circuit to take the picture elements of the pictures $IS_n$ and $IS_{n+1}$ as a function of calculations to be effected. A coherence circuit 22 processes the different vectors $\vec{D}$ and supplies a validation signal KF for a selection circuit 25. It is this selection circuit which supplies the vector $\vec{DF}$ used by the interpolation means 5.

This selection circuit 25 is shown in FIG. 1 in the form of a multiplexer circuit having two inputs. The vector $\vec{D}$ is applied to an input after having been appropriately delayed by the delay members 27 and 28, and the vector $\vec{O}$, that is to say a vector corresponding to zero motion, is applied to a further input. This vector constitutes an alternative vector in the case the vector $\bar{D}$ is not retained. If the signal KF is active, the vector $\bar{D}F$ is the vector retained.

According to the invention, the coherence circuit 22 is formed of two portions: a first portion 30 and a second portion 32. The first portion 30 supplies an indication about the spatial coherence of the vector $\bar{D}$, that is to say the vector $\bar{D}$ is compared with other vectors $\bar{D}$ assigned to picture elements forming part of the environment of the coordinate point $\bar{x}$ and second the portion 32 supplies the validation signal KF by making a temporal analysis of the signals KF relative to corresponding points in a number of pictures $IP_n$.

The different processing operations are effected at the rate of a time base 50 which then supplies the coordinates $\bar{x}$ of the element to be processed. As the intended processing operations take time, several delay members render it possible to re-establish the assignment of the calculated quantities to the picture elements to be processed. Thus, a delay member 52 is disposed, which gives the first value $\bar{x}$ to the portion 30, the delay member 53 to the second portion 32 and the delay member 54 to the interpolation means 5. The delay members 56 and 58 produce the delays which are suitable for the picture elements of the source sequence, so as to provide that the interpolation member can calculate the picture element which is interpolated in conformity with the vector $\bar{D}F$ available at output 3.

Figure 4:
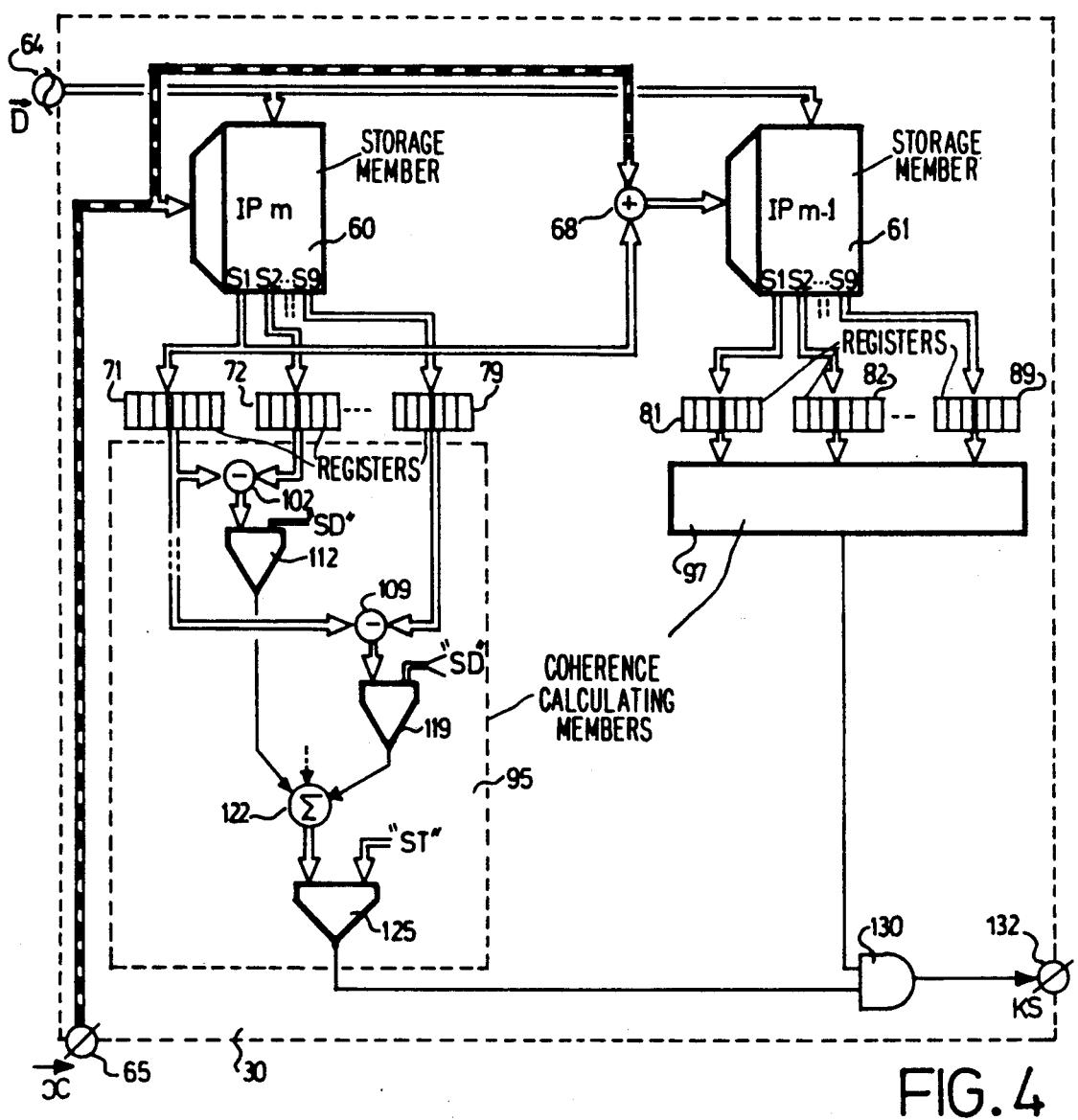
FIG. 4 shows the structure of the first part of the coherence circuit.
Figure 5:
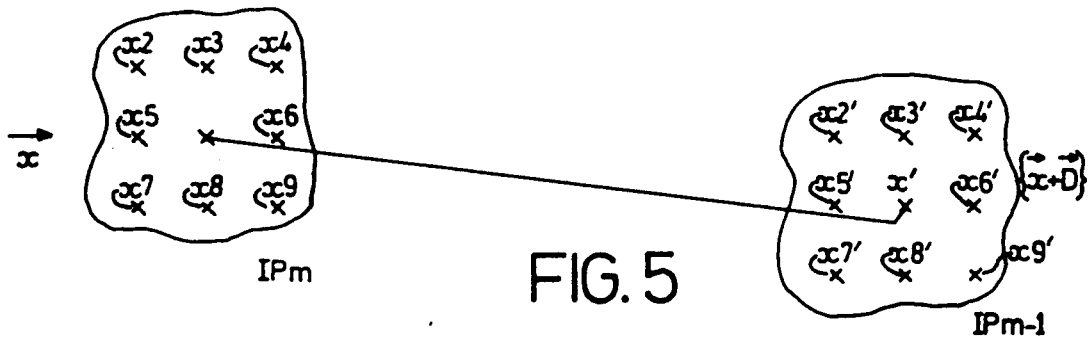
FIG. 5 shows the picture elements on the basis whereof the spatial coherence is examined.

In FIG. 4, the first portion 30 is shown in greater detail, which portion actually effects a determination of the temporal coherence in addition to a spatial coherence. This portion comprises two storage members 60 and 61 intended to contain the motion vectors relating to the pictures $IP_m$ and $IP_{m-1}$. The first portion 30 has an input 64 for receiving the different vectors $\bar{D}$ and an input 65 for receiving the indication $\bar{x}$ of the picture element to be processed, the member 60 has nine outputs S1 to S9. At the outputs S2 to S9 the displacement vectors appear which are assigned to the elements surrounding the point x, being the points x2 to x9 shown in FIG. 5, and at the output S1 the vector $\bar{D}$ relating to the point $\bar{x}$ itself. Similarly, the member 61 has nine outputs S1 to S9. The vector $\bar{D}'$, corresponding to an element x' which was the element x in the preceding picture, appears at the output S1 of the member 61. The storage member 61 is therefore addressed by means of an adder 68 which takes the (vectorial) sum of the quantity present at the output S1 of the member 60 and the quantity x. The motion vectors of the points x2' to x9', surrounding the element x', appear at outputs S2 to S9 of the member 61. Different registers 71 to 79 will contain the vectors at the output of the member 60, and registers 81 to 89 will contain the vectors at the outputs of the member 61. Two coherence calculating members 95 and 97 of identical structures are provided at the outputs of these registers. The motion vectors assigned to the point $\bar{x}$ will be compared to the eight aforementioned points. This is effected by subtraction members 102 to 109 and comparators 112 to 119 which compare the difference with a threshold value SD corresponding to a displacement of several pixels.

When the differences fall short of the threshold, the value "1" is given to the outputs of the comparators. These values are added by an adder 122. The value of the output of that adder is finally compared to a value of the threshold "ST", for example 4, by means of a comparator 125, 35 so that an active signal of the value "1" at the output of the comparator 125 indicates that a majority of the vectors relating to the environment are coherent relative to each other. The same step is effected in the interior of the member 97 relative to the point $\bar{x}'$. AND-gate 130 combines the results of the members 95 and 97 to apply the signal KS to the output 132.

Figure 6:
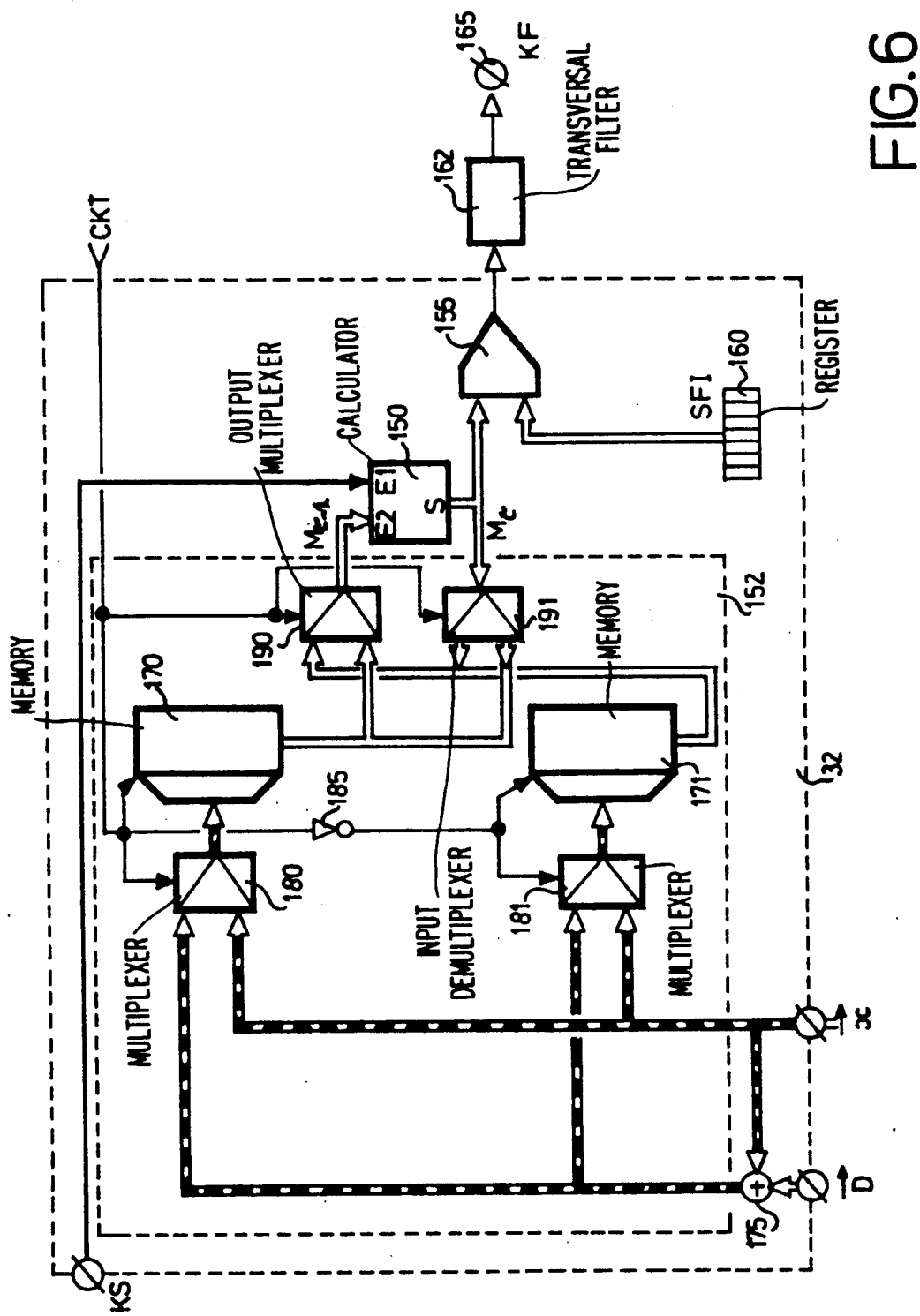
FIG. 6 shows the structure of the second part of the coherence circuit.

The portion 32, shown in FIG. 6, is comprised of accumulation means developed around a calculator 150 and a memory circuit 152. The calculating circuit 150 has two inputs E1 and E2 to receive the signal KS and a value $M_{t-1}(\bar{x}-\bar{D})$ calculated at the preceding picture, relative to an element $\bar{x}$, and an output S to supply a signal $M_t$ to be assigned to the element $\bar{x}$. The calculating circuit performs the following calculations:

$$\text{when } KS=1 \ M_t(\vec{x})=128+\tfrac{1}{2}[M_{t-1}(\vec{x}-\vec{D})]$$

and $$\text{when } KS=0 \ M_t(\vec{x})=0$$

$\bar{D}$ might be given a factor $\alpha$ to take the respective distances between the source pictures and the pictures of the sequence to be processed into account.

Figure 7:
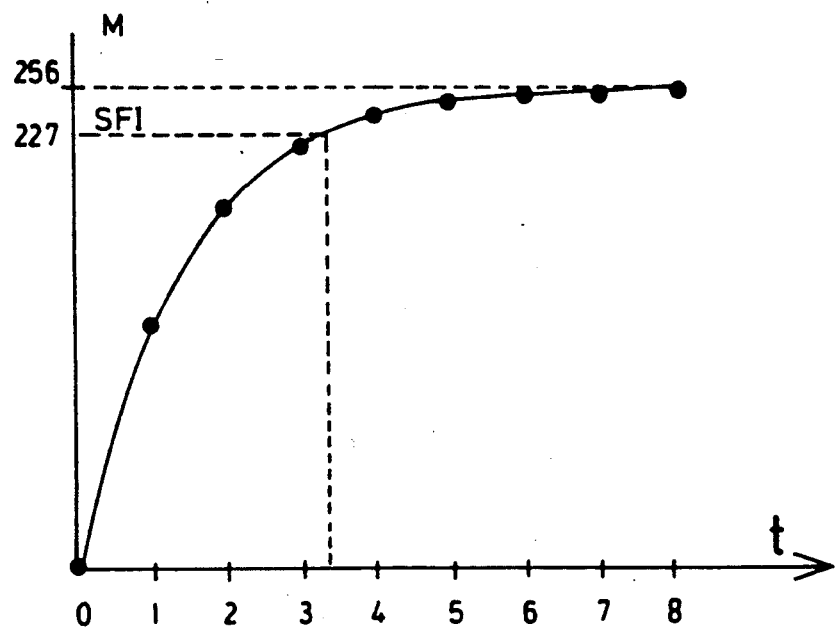
FIG. 7 shows the development of a variable which is important to the functioning of the coherence circuit.

When KS=1 for a large number of consecutive pictures, its development is represented in FIG. 7. A threshold circuit 155 fixes the data at which the coherence is evaluated, for example a threshold value 227 indicates that the coherence is evaluated over four pictures, a higher treshold value permits testing of the coherence for a larger number of pictures; this threshold value SFI is stored in a register 160 whose contents can vary as a function of the user's wishes. This value can vary from 128 to 255 if the 8-bit mode is used, or from $2^n$ to $2^{n+1}-1$ if the n-bit mode is used, $M_t(\vec{x})$ than being:

$$M_t(x)=A+\{M_{t-1}[x-\alpha D_0(x)]/B\}$$

wherein A may have a value $2^n$ and B may have the value 2, as in the foregoing. The signal supplied by the comparator 155 can be filtered by a transversal filter 162 which is connected to the output of the section 32 and which can improve the result to a still further extent. The signal KF appears at the output 165 of the filter 162.

The memory circuit 152 is formed from two memories 170 and 171 which are alternately adjusted to the read and the write mode at the rate of a signal CKT originating from the time base 50, this signal being linked to the rate of the pictures to be processed. The write address of the memories is given by $\bar{x}$ and the read address by an adder 175 which takes the sum $\bar{x}-\bar{D}$, this vector $\bar{D}$ being considered at the output of the circuit 27. The choice of these addresses for the memories 170 and 171 is effected by the multiplexers 180 and 181 the first of which is controlled by the signal CKT and the second by the signal $\overline{CKT}$, supplied by the inverter 185. The data inputs of the memories 170 and 171 are managed by an output multiplexer 190 and an input demultiplexer 191 controlled by the signal CKT.

Figure 8:
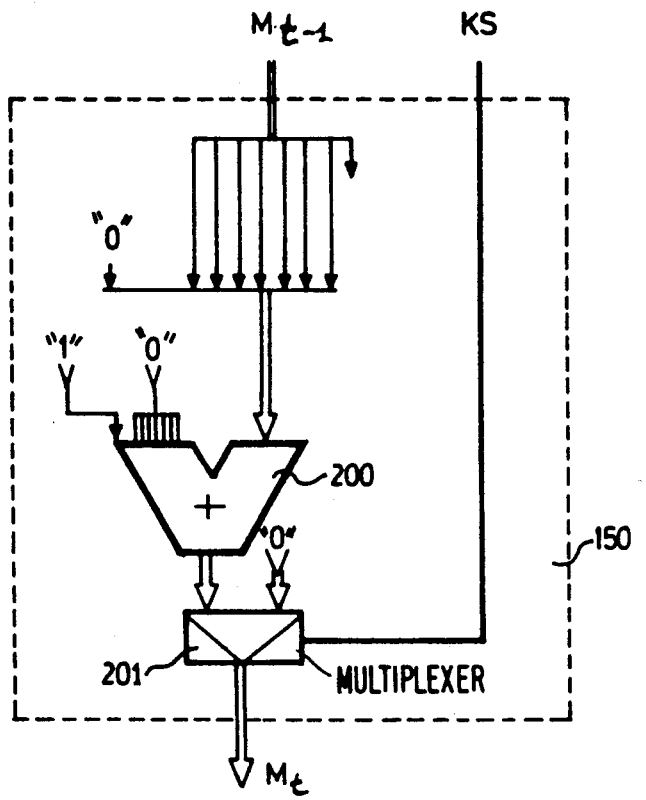
FIG. 8 shows in detail a calculating circuit forming part of the second portion.

The circuit 150 is shown in FIG. 8. The division by two of the equation given in the foregoing is effected by shifting the wires supplying $M_{t-1}$; an adder 200 adds 128 to this last result. A multiplexer 201 supplies the result M which is either "0" if KS=0, or the result of the adder if KS=1. The result is then stored in one of the memories 170 or 171 according to the signal CKT.

Without departing from the scope of the invention, it is possible to realize several variations which take into account the facts:

that several alternative vectors may be used which are different from the vector $\bar{O}$ and may correspond to global motions;

that the coherence can be effected for one picture only at the level of the portion 30, that the filter 162 may be a three-dimensional filter, that is to say a spatial-temporal filter.

I claim:

1. An arrangement for estimating motion of picture elements of a picture forming part of a sequence of pictures to be processed, the arrangement having an input for receiving a sequence of source pictures, a motion determining circuit for supplying a first motion vector for all the picture elements of the pictures of the sequence to be processed, a coherence circuit for supplying a validation signal of the first motion vector and a selection circuit, controlled by the coherence circuit, for supplying a definitive motion vector on the basis of said first motion vector and at least one alternative motion vector, wherein said coherence circuit comprises a first portion for supplying a first coherence signal relating to a first picture element on the basis of said first and at least one alternative motion vectors assigned to picture elements surrounding said first picture element, and a second portion for supplying a second coherence signal on the basis of a plurality of first coherence signals assigned respectively to picture elements corresponding to said first picture element in each of a number of pictures of the sequence to be processed.

2. A motion estimating arrangement as claimed in claim 1 wherein a first alternative motion vector is the vector zero corresponding to the absence of motion.

3. A motion estimating arrangement as claimed in claim 2, wherein a filter member is provided to supply the validation signal for the selection circuit on the basis of the two coherence signals.

4. A motion estimating arrangement as claimed in claim 2, wherein the second portion comprises adder means of the recursive type, for supplying a signal representing the sum of the previous values of the first coherence signals for a given element and threshold means for rendering the second signal active when the sum signal exceeds a predetermined threshold.

5. A motion estimating arrangement as claimed in claim 1, wherein a filter member is provided to supply the validation signal for the selection circuit on the basis of the two coherence signals.

6. A motion estimating arrangement as claimed in claim 5, wherein the second portion comprises adder means of the recursive type, for supplying a signal representing the sum of the previous values of the first coherence signals for a given element and threshold means for rendering the second signal active when the sum signal exceeds a predetermined threshold.

7. A motion estimating arrangement as claimed in claim 6, wherein the adder means include:

calculating means for assigning at the time t to a picture element having the coordinate x, the value $M_t(x)$ from a preceding value $M_{t-1}(-)$ which is equal to $$M_t(x) = A + \{M_{t-1}[x - \alpha D(x)]/B\}$$

when the first coherence signal relative to the point x is active, and:

$$M_t(x) = 0$$

when the first signal is not active,

A and B being constants, $\alpha$ being an adjusting factor to be applied to the first motion vector D(x) to take into account the respective distances between the pictures from the source sequence and from the sequence to be processed, and storage means for registering the values $M_t(-)$.

8. A motion estimating arrangement as claimed in claim 1, wherein the second portion comprises adder means of the recursive type, for supplying a signal representing the sum of the previous values of the first coherence signals for a given element and threshold means for rendering the second signal active when the sum signal exceeds a predetermined threshold value.

9. A motion estimating arrangement as claimed in claim 8, wherein the adder means include:

calculating means for assigning at the time t to a picture element having the coordinate x, the value $M_t(x)$ from a preceding value $M_{t-1}(-)$ which is equal to $$M_t(x) = A + \{M_{t-1}[x - \alpha D(x)]/B\}$$

when the first coherence signal relative to the point x is active, and:

$$M_t(x) = 0$$

when the first signal is not active,

A and B being constants, $\alpha$ being an adjusting factor to be applied to the first motion vector D(x) to take into account the respective distances between the pictures from the source sequence and from the sequence to be processed, and storage means for registering the values $M_t(-)$.

10. A motion estimating arrangement as claimed in claim 9, acting on digital n-bit values, wherein $$A = 2^n$$

$$B = 2$$

and in that the predetermined threshold value is comprised between $2^n$ and $2^{n+1} - 1$.

11. A motion estimating arrangement as claimed in claim 1, wherein said second coherence signal constitutes the validation signal for the selection circuit.

12. A motion estimating arrangement as claimed in claim 11, wherein a first alternative motion vector is the vector zero corresponding to the absence of motion.

13. A motion estimating arrangement as claimed in claim 11, wherein a filter member is provided to supply the validation signal for the selection circuit on the basis of the two coherence signals.

14. A motion estimating arrangement as claimed in claim 11, wherein the second portion comprises adder means of the recursive type, for supplying a signal representing the sum of the previous values of the first coherence signals for a given element and threshold means for rendering the second signal active when the sum signal exceeds a predetermined threshold value.

15. A motion estimating arrangement as claimed in claim 14, wherein the adder means include:
calculating means for assigning at the time t to a picture element having the coordinate x, the value $M_t(x)$ from a preceding value $M_{t-1}(-)$ which is equal to $$M_t(x) = A + \{M_{t-1}[x - \alpha D(x)]/B\}$$

when the first coherence signal relative to the point x is active, and:

$$M_t(x) = 0$$

when the first signal is not active,
A and B being constants,
$\alpha$ being an adjusting factor to be applied to the first motion vector D(x) to take into account the respective distances between the pictures from the source sequence and from the sequence to be processed, and
storage means for registering the values $M_t(-)$.

16. A motion estimating arrangement as claimed in claim 15, acting on digital n-bit values wherein $$A = 2^n$$

$$B = 2$$

and in that the predetermined threshold value is comprised between $2^n$ and $2^{n+1} - 1$.

17. A standards converter comprising:
an arrangement for estimating motion of picture elements of a picture forming part of a sequence of pictures to be processed, the arrangement having an input for receiving a sequence of source pictures, a motion determining circuit for supplying a first motion vector for all the picture elements of the pictures of the sequence to be processed, a coherence circuit for supplying a validation signal of the first motion vector and a selection circuit, controlled by the coherence circuit, for supplying a definitive motion vector on the basis of said first motion vector and at least one alternative motion vector, wherein said coherence circuit comprises a first portion for supplying a first coherence signal relating to a first picture element on the basis of said first and at least one alternative motion vectors assigned to picture elements surrounding said first picture element, and a second portion for supplying a second coherence signal on the basis of a plurality of first coherence signals assigned respectively to picture elements corresponding to said first picture element in each of a number of pictures of the sequence to be processed.

18. An anti-flicker device comprising:
an arrangement for estimating motion of picture elements of a picture forming part of a sequence of pictures to be processed, the arrangement having an input for receiving a sequence of source pictures, a motion determining circuit for supplying a first motion vector for all the picture elements of the pictures of the sequence to be processed, a coherence circuit for supplying a validation signal of the first motion vector and a selection circuit, controlled by the coherence circuit, for supplying a definitive motion vector on the basis of said first motion vector and at least one alternative motion vector, wherein said coherence circuit comprises a first portion for supplying a first coherence signal relating to a first picture element on the basis of said first and at least one alternative motion vectors assigned to picture elements surrounding said first picture element, and a second portion for supplying a second coherence signal on the basis of a plurality of first coherence signals assigned respectively to picture elements corresponding to said first picture element of a number of pictures of the sequence to be processed.

* * * * *